United States Patent Office 3,410,921
Patented Nov. 12, 1968

3,410,921
TRANSALKYLATION OF POLYALKYLATED AROMATIC COMPOUNDS USING A CRYSTALLINE ALUMINOSILICATE CATALYST
Ernest L. Pollitzer, Hinsdale, Ill., assignor to Universal Oil Products Company, Des Plaines, Ill., a corporation of Delaware
No Drawing. Filed June 27, 1966, Ser. No. 560,786
10 Claims. (Cl. 260—672)

ABSTRACT OF THE DISCLOSURE

Transalkylating a polyalkylated aromatic compound by reacting the compound, in admixture with hydrogen, with an alkylatable aromatic compound in contact with a catalyst comprising an active catalytic component, preferably a Group VIII metal, on an alumina support having suspended therein less than about 20 weight percent of a finely divided crystalline aluminosilicate, under transalkylation conditions including a temperature of 250°–700° C., a pressure of 1–200 atmospheres, and a hydrogen to hydrocarbon mol ratio of from about 2:1 to about 20:1.

---

This invention relates to a conversion process for the transalkylation of polyalkylated aromatic compounds into more useful compounds. More specifically, this invention is concerned with a conversion process for the transalkylation of a polyalkylated aromatic compound with an alkylatable aromatic compound utilizing a novel catalyst consisting essentially of a support comprising a finely divided crystalline aluminosilicate suspended in an alumina matrix having at least one catalytic ingredient deposited on said support.

It is therefore an object of this invention to provide a process for the transalkylation of polyalkylated aromatic compounds utilizing a novel transalkylation catalyst.

A specific object of this invention is to provide a novel method and a novel catalyst for transalkylating polyalkylated aromatic hydrocarbons to provide the desired monoalkylated product in high yields.

One embodiment of the invention relates to a conversion process which comprises transalkylating a polyalkylated aromatic compound with an alkylatable aromatic compound at a temperature in the range of from about 250° to about 700° C., a pressure in the range of from about atmospheric to about 200 atmospheres and a hydrogen to hydrocarbon mol ratio of from about 2:1 to about 20:1 in contact with a catalyst containing a finely divided crystalline aluminosilicate suspended in an alumina matrix and having at least one active catalytic ingredient carried by the matrix.

Other objects and embodiments referring to alternative polyalkylated aromatic compounds and to alternative catalytic compositions of matter will be found in the following further detailed description of the invention.

It has now been discovered that polyalkylated aromatic compounds and particularly polyalkylated aromatic hydrocarbons may be converted to other and more useful compounds by contacting said polyalkylated aromatic compound with an alkylatable aromatic compound in the presence of certain catalytic compositions of matter which are prepared by specific methods. Suitable polyalkylated aromatic compounds utilizable in the process of this invention, although not necessarily with equivalent results, include the polyalkylated aromatic hydrocarbons, and preferably, the polyalkylated benzene hydrocarbons such as the various polyethylbenzenes, polypropylbenzenes, polybutylbenzenes and higher molecular weight polyalkylbenzenes and mixtures thereof. Examples of other polyalkylated aromatic hydrocarbons utilizable within the scope of this invention include the various polyalkylnaphthalenes, polyalkylanthracenes, polyalkylpyrenes, polyalkylchrysenes, etc. It is to be understood that the hereinabove mentioned polyalkylated aromatic compounds are only representatives of the class of compounds which may be transalkylated as the alkyl substituents may not necessarily be the same, and that the present invention is not necessarily limited thereto.

Examples of alkylatable aromatic compounds which are utilizable as transalkylating agents according to the process of this invention include benzene, toluene, ortho-xylene, metaxylene, para-xylene, ethylbenzene, ortho-ethyltoluene, metaethyltoluene, para-ethyltoluene, 1,2,3-trimethylbenzene, 1,2,4-trimethylbenzene, 1,3,5-trimethylbenzene, diethylbenzene, triethylbenzene, normal propylbenzene, isopropylbenzene, etc. and mixtures thereof. Preferred alkylatable aromatic compounds are the monocyclic aromatic hydrocarbons, that is, the benzene hydrocarbons. Higher molecular weight alkyl aromatic hydrocarbons are also suitable. These include those aromatic hydrocarbons such as are produced by the alkylation of aromatic hydrocarbons with olefin polymers and are used as intermediates in the preparation of sulfonate surface-active agents. Such products are frequently referred to in the art as alkylate, and include hexylbenzenes, nonylbenzenes, dodecylbenzenes, pentadecylbenzenes, hexyltoluenes, nonyltoluenes, dodecyltoluenes, pentadecyltoluenes, etc. Very often, alkylate is obtained as a high boiling fraction in which the alkyl group attached to the aromatic nucleus varies in size from about $C_9$ to $C_{18}$. Other suitable aromatic hydrocarbons, which at specified conditions, depending upon the melting point of the aromatic chosen, would be in liquid form, would include those aromatic hydrocarbons with two or more aryl groups such as diphenyl, diphenylmethane, triphenylmethane, fluorene, stilbene, etc. Examples of other aromatic hydrocarbons utilizable within the scope of this invention which at specified transalkylation conditions, depending upon melting point of the aromatic chosen, would be in liquid form, include those containing condensed aromatic rings. These include naphthalene, alkyl naphthalenes, anthracene, phenanthrene, naphthacene, rubrene, etc. Of the above-mentioned aromatic hydrocarbons that could be utilized as transalkylation agents in the process of this invention, the benzene hydrocarbons are preferred, and of the preferred benzene hydrocarbons, benzene itself is particularly preferred.

As hereinbefore set forth, the invention is concerned with a process for the transalkylation of polyalkylated aromatic compounds, said process being effected in the presence of a catalyst which possesses a high degree of hydrocarbon conversion activity and is particularly effective as a transalkylation catalyst for polyalkylated aromatic compounds, a representative number of which are hereinabove set forth. The novel catalysts employed in this invention consist essentially of a support comprising a finely divided crystalline aluminosilicate dispersed in an alumina matrix and at least one catalytic ingredient deposited on said support. The dual-function catalysts having halogen and a metal possessing hydrogenation-dehydrogenation activity are the preferred catalytic ingredients to be deposited on said support and form a novel catalyst for use in the process of this invention. Especially preferable ingredients are at least one halogen selected from the group consisting of chlorine, fluorine and bromine and a metal selected from Group VIII of the Periodic Table (platinum and palladium being the most preferred).

The crystalline aluminosilicates are composed of $SiO_4$ and AlO$_4$ tetrahedra, a silicon or aluminum atom being centered around four oxygen atoms in the tetrahedra and the oxygens being shared with other surrounding tetrahedra. These aluminosilicates are geometrically arranged to form a pore structure having sufficiently large pore mouths to permit the reactant molecules pass into said pore structure. Preferably, the aluminosilicates employed in the catalyst support have pore mouths of from about 5 up to about 15 angstroms in cross-sectional diameter. The aluminosilicates are treated to improve their catalytic activity by techniques such as ion-exchange with suitable cations and thermal treatment. Ordinarily, the aluminosilicates are synthetically prepared in the alkali metal form (usually sodium) and there is one monovalent alkali metal cation associated with each aluminum centered tetrahedra (to maintain electrical neutrality). The aluminosilicates may be ion-exchanged with polyvalent cations such as calcium, magnesium, beryllium, rare earths, etc., to replace a substantial amount of the monovalent cations. This causes one polyvalent cation to be associated with more than one aluminum centered tetrahedra and if these tetrahedra are spread sufficiently far apart (due to the presence of silicon centered tetrahedra), areas of local electrical charge will be formed which aid in promoting catalytic reactions. Another treating technique to improve the catalytic activity of the aluminosilicates is to ion-exchange with ammonium ions followed by thermal treatment, preferably above 300° C. to convert the crystalline aluminosilicate to the hydrogen form.

There are numerous types of crystalline aluminosilicates, both synthetic and natural occurring. It is preferable that the pore mouths of the crystalline aluminosilicates have a cross-sectional diameter of from about 5 to about 15 angstrom units. Among the preferable crystalline aluminosilicates that are suitable are the hydrogen and/or polyvalent forms of faujasite, and mordenite, and especially preferable is the hydrogen form of mordenite.

The concentration of crystalline aluminosilicate in the alumina matrix is preferably less than about 20 weight percent of the alumina although in some cases greater concentrations may also be suitable. I especially prefer concentrations of aluminosilicate of about 10 weight percent or less. The preferable concentration of Group VIII metal depends to a large extent on the metal. When employing noble metals such as platinum, the concentration on the catalyst is preferably from about 0.05 to about 5 weight percent whereas in the case of non-noble metals such as nickel, preferable concentrations range from about 1 to about 40 weight percent. Chloride is the preferred halogen and may be present in the catalyst in concentrations up to about 3.0 weight percent although lower values of from about 0.1 to about 2.0 weight percent are preferred.

The process of this invention utilizing the catalyst hereinbefore set forth may be effected in any suitable manner and may comprise either a batch or a continuous type operation. The preferred method by which the process of this invention may be effected is a continuous type operation. One particular method is the fixed bed operation in which the polyalkylated aromatic compound and the alkylatable aromatic compound are continuously charged to a reaction zone containing a fixed bed of the desired catalyst, said zone being maintained at the proper operating conditions of temperature and pressure, that is, a temperature in the range of from abuot 250° to about 700° C. or more, preferably 460° to about 550°, a pressure including a pressure of from about atmospheric to about 200 atmospheres or more, and a hydrogen to hydrocarbon mol ratio of from about 2:1 to about 20:1. The catalyst is suitable for either gas phase or liquid phase reactions so that the liquid hourly space velocity (the volume of charge per volume of catalyst per hour) may be maintained in the reaction zone in the range of from about 0.1 to about 20 or more, preferably in the range of from about 0.1 to about 10, or at a gaseous hourly space velocity in the range of from about 100 to about 1500 or more. The reaction zone may comprise an unpacked vessel or coil or may be lined with an adsorbent packing material. The two reactants may be charged through separate lines or, if so desired, may be admixed prior to entry into said reaction zone and charged thereto in a single stream. This charge passes through the catalyst bed in either an upward or downward flow and the transalkylation product is continuously withdrawn, separated from the reactor effluent, and recovered, while any unreacted starting materials may be recycled to form a portion of the feed stock. It is also contemplated within the scope of this invention that reaction gases such as nitrogen, argon, etc., may also be charged to the reaction zone if desired.

It is also contemplated within the scope of this invention that certain sulfur containing components, in an amount of from about 0.001 weight percent to about 2.0 weight percent of the hydrocarbon feed, including sulfur, hydrogen sulfide, primary, secondary and tertiary alkane and cycloalkane thiols, alkane sulfides and disulfides, thiophenes and thiophanes may be, if desired, added to the transalkylation reaction zone by, for example, commingling it with the hydrocarbon charge stock passing thereto, or, by adding the sulfur containing component simultaneously with, but independently of said hydrocarbon charge. However, the particular catalyst utilized as well as the particular polyalkylated aromatic compound to be transalkylated as well as the particular transalkylation agent will dictate whether a sulfur component is desired and the amount that is necessary for efficient operation of my transalkylation process.

Another continuous type operation comprises the moving bed type in which the reactants and the catalyst bed move either concurrently or countercurrently to each other while passing through said reaction zone. Still another type of operation which may be used is the batch type operation in which a quantity of the polyalkylated aromatic hydrocarbon, the alkylatable aromatic compound and the catalyst are placed in an appropriate apparatus such as, for example, a rotating or stirred autoclave. The apparatus is then heated to the desired temperature and maintained thereat for a predetermined residence time at the end of which time the flask and contents thereof are cooled to room temperature and the desired reaction product is recovered by conventional means, such as, for example, by washing, drying, fractional distillation, crystallization, etc.

The following examples are given to illustrate the process of the present invention which, however, are not intended to limit the generally broad scope of the present invention in strict accordance therewith.

Example I

Aluminum metal, having a purity of 99.99 weight percent is digested in hydrochloric acid to produce a sol having a weight ratio of Al/Cl of about 1.15 and a specific gravity of 1.3450. An aqueous solution containing 28 weight percent HMT is made up and 700 cc. of the HMT solution is added to 700 cc. of the above related sol solution and thoroughly mixed to form a dropping solution. About 20 grams of the hydrogen form of synthetic mordenite in the form of a fine powder is added to the alumina sol and thoroughly dispersed therein. Another portion of the mordenite is chemically analyzed and is found to contain 11.6 weight percent $Al_2O_3$, 87.7 weight percent $SiO_2$ and 0.2 weight percent Na. Still another portion of the mordenite is analyzed for particle size distribution. The results show that 57.6 weight percent of the powder is between 0 and 20 microns in size, 69.5 weight percent of the powder is between 0 and 40 microns in size and 82.1 weight percent of the powder is between 0 and 60 microns in size.

The alumina sol containing the dispersed mordenite is passed through a vibrating dropping head and dropped in discrete particles into a forming oil maintained at 95° C. The rate of vibration and the volumetric flow of alumina sol is set to produce finished spherical particles of about 1/16 of an inch in diameter. The dropped particles are aged in oil overnight (about 16 hours), separated from the oil and aged in an ammonia solution at 95° C. for about three hours. The aged spherical particles are then partially water washed to remove at least a portion of the neutralization salts and dried. The particles are thereupon calcined at 600° C. for 4 hours in dry air to yield a catalyst support having an ABD of between 0.4 and 0.5.

About 350 cc. of the catalyst support is placed in a steam jacketed rotating vessel and 250 cc. of an impregnation solution containing chloroplatinic acid and HCl is added thereto. The impregnation solution contains 131.2 cc. of 10 milligram per milliliter of platinum and about 8.4 cc. of concentrated HCl. The vessel is rotated until all the liquid solution is evaporated. The catalyst particles are then oxidized to produce a finished catalyst containing about 0.75 weight percent platinum, about 0.75 weight percent chloride and about 10 weight percent mordenite type aluminosilicate. This catalyst is designated as catalyst A.

Example II

A second batch of catalyst is made exactly the same as described in Example I except the impregnation solution contains a palladium chloride salt dissolved in HCl instead of chloroplatinic acid. This results in a finished catalyst being produced containing about 0.75 weight percent palladium, about 0.75 weight percent chloride and 10 weight percent mordenite. This catalyst is designated as catalyst B.

Example III

The catalyst prepared according to Example I above and designated as catalyst A is utilized in a transalkylation reaction to determine the transalkylation activity of said catalyst. In this experiment, 75 cc. of the catalyst prepared according to the method of Example I is placed in an appropriate apparatus which is provided with heating means. In the experiment, diethylbenzenes are mixed with a sevenfold molar quantity of benzene and passed to the transalkylation reaction zone. The reactor is maintained at about 300 p.s.i.g., 460° C., a liquid hourly space velocity of 2, and a hydrogen to hydrocarbon mol ratio of 8:1. The product is analyzed by mass spectrometer and it is found to contain substantial quantities of ethylbenzene indicating that transalkylation has occurred.

Example IV

The catalyst prepared according to Example II and designated as catalyst B is utilized in the transalkylation reaction zone, 100 cc. of the finished catalyst being placed in the transalkylation apparatus. In the experiment, benzene and polyethylbenzenes in 10:1 molar ratio are charged separately to the transalkylation zone which is maintained at about 500 p.s.i.g., 500° C. and an 8:1 hydrogen to hydrocarbon mol ratio. Substantial conversion of the polyethylbenzenes is obtained. The product is again analyzed by mass spectrometer and it is found that the product comprises ethylbenzene, a small amount of diethylbenzenes and unreacted benzene indicating that transalkylation has occurred.

Example V

The catalyst prepared according to Example I and designated as catalyst A is utilized in a transalkylation reaction, 100 cc. of fresh finished catalyst being placed in the transalkylation apparatus. In the experiment, benzene and polyisopropylbenzenes in 10:1 molar ratio are charged separately to the transalkylation zone. The reactor is maintained at about 400 p.s.i.g., 475° C. and an 8:1 hydrogen to hydrocarbon mol ratio. Substantial conversion of the polyisopropylbenzenes is obtained. The product is analyzed by mass spectrometer and it is found that the product comprises cumene, small amounts of diisopropylbenzenes, and unreacted benzene.

Example VI

The catalyst prepared according to Example II above and designated as catalyst B is again utilized in a transalkylation reaction. A fresh batch (75 cc.) of the catalyst is placed in a transalkylation reactor which is maintained at a temperature of about 460° C. and a pressure of about 500 p.s.i.g. In the experiment, toluene and poly sec-butylbenzenes in 8:1 molar ratio are charged separately to the transalkylation zone. Substantial conversion of the poly sec-butylbenzenes is obtained. The product is analyzed by mass spectrometer and it is found that the product comprises sec-butylbenzene, sec-butyltoluenes, small amounts of benzene, polybutylbenzenes, poly-butyltoluenes and unreacted toluene indicating once again that transalkylation has occurred.

Example VII

The catalyst prepared according to Example I and designated as catalyst A is again utilized in a transalkylation reaction. A fresh 100 cc. batch of the catalyst is placed in the transalkylation reactor which is maintained at a temperature of about 510° C., a pressure of about 300 p.s.i.g., a hydrogen to hydrocarbon mol ratio of 8:1 and an LHSV of 2.0. In the experiment, toluene and 1,2,4-trimethylbenzene in 2:1 molar ratio are charged to the transalkylation zone. The product is analyzed and substantial conversion to the xylenes occurs.

I claim as my invention:

1. A conversion process which comprises transalkylating a polyalkylated aromatic compound with an alkylatable aromatic compound at a temperature in the range of from about 250° to about 700° C., at a pressure in the range of from about atmospheric to about 200 atmospheres, and a hydrogen to hydrocarbon mol ratio of from about 2:1 to about 20:1 in contact with a catalyst comprising a Group VIII metal component on a solid support comprising an alumina matrix having suspended therein less than about 20 weight percent of a finely divided crystalline aluminosilicate, said support having been prepared by commingling said crystalline aluminosilicate in finely divided state with an alumina sol, gelling the resultant mixture and then calcining the gelled mixture, said Group VIII metal component having been incorporated into said solid support containing crystalline aluminosilicate and alumina after said calcining of the gelled mixture.

2. The process of claim 1 further characterized in that the crystalline aluminosilicate is in the hydrogen form.

3. The process of claim 2 further characterized in that the crystalline aluminosilicate is a mordenite type and the Group VIII metal is selected from the group consisting of nickel, platinum and palladium.

4. The process of claim 3 further characterized in that the metal is platinum and the concentration of platinum on the catalyst is from about 0.05 to about 5.0 percent by weight.

5. The process of claim 4 further characterized in that said polyalkylated aromatic compound is a polyalkylated aromatic hydrocarbon and that said alkylatable aromatic compound is an alkylatable aromatic hydrocarbon.

6. The process of claim 5 further characterized in that said polyalkylated aromatic hydrocarbon is a polyalkylated benzene hydrocarbon and that said alkylatable aromatic hydrocarbon is an alkylatable benzene hydrocarbon.

7. The process of claim 5 further characterized in that said polyalkylated benzene hydrocarbon is a mixture of polyethylbenzenes and that said alkylatable benzene hydrocarbon is benzene.

8. The process of claim 5 further characterized in that said polyalkylated benzene hydrocarbon is a mixture of polyisopropylbenzenes and that said alkylatable benzene hydrocarbon is benzene.

9. The process of claim 5 further characterized in that said polyalkylated benzene hydrocarbon is a mixture of polybutylbenzenes and that said alkylatable benzene hydrocarbon is toluene.

10. The process of claim 5 further characterized in that said polyalkylated benzene hydrocarbon is 1,2,4-trimethylbenzene and that said alkylatable benzene hydrocarbon is toluene.

References Cited

UNITED STATES PATENTS

| | | | |
|---|---|---|---|
| 2,834,821 | 5/1958 | Bergsteinsson | 260—674 |
| 2,966,529 | 12/1960 | Haensel et al. | 260—668 |
| 3,079,447 | 2/1963 | Bartlett et al. | 260—668 |
| 3,140,253 | 7/1964 | Plank et al. | 208—120 |
| 3,281,483 | 10/1966 | Benesi et al. | 260—672 |

DELBERT E. GANTZ, *Primary Examiner.*

G. E. SCHMITKONS, *Assistant Examiner.*